Nov. 6, 1962  J. A. ROEHRIG  3,062,526

VEHICLE LEAF SPRING SUSPENSION

Filed Aug. 24, 1959

INVENTOR.
John A. Roehrig
BY
*William J. Ruano*
ATTORNEY

3,062,526
VEHICLE LEAF SPRING SUSPENSION
John A. Roehrig, 311 Field Club Ridge Road,
Pittsburgh 38, Pa.
Filed Aug. 24, 1959, Ser. No. 835,754
2 Claims. (Cl. 267—48)

This invention relates to a vehicle spring suspension and, more particularly, to a spring suspension of the type in which the effective length of the spring is automatically shortened as the result of an increase in weight on the vehicle frame, or as the result of tensioning or straightening of the spring caused by road irregularities, and for the purpose of stiffening the spring under such conditions so as to avoid the possibility of breakage of the end thereof, and increase its load capacity. The present application is an improvement over my Patent No. 2,705,140 issued March 29, 1955.

It is known in the art to provide a vehicle spring suspension with helper or auxiliary springs, or to provide means for automatically varying the effective length of the spring as the result of loading conditions or road irregularities. However, conventional spring suspensions of these types have the outstanding disadvantage of being rather complicated in construction, many requiring radius rods or requiring shackle assemblies at both ends while others include a number of auxiliary or helper springs or parts which are relatively slidable, therefore, subject to excessive wear from friction, also they are expensive to manufacture. In some types, a solid rolling shoe is used for varying the load carrying points on the leaf spring. However, such shoe, being rigid detracts appreciably from the softness of the ride. In the device shown in my prior patent a shoe slides on the frame and as a result will wear from friction and require replacement.

An object of my invention is to provide a novel vehicle spring suspension which embodies means for automatically shortening the effective length of the spring as the result of an increase in load or as the result of road irregularities, which spring comprises parts which are relatively simple and economical to manufacture and assemble as well as having long life.

A further object of my invention is to provide, in a vehicle spring suspension, a means at the end of the leaf spring, which includes a yieldable rolling member for not only shortening the length of the spring but for contributing its yieldability as a helper element or auxiliary spring in response to loading of the vehicle frame or rebound from road irregularities.

Other objects and advantages of the present invention will become apparent from a study of the following description taken with the accompanying drawing wherein.

Figure 1:
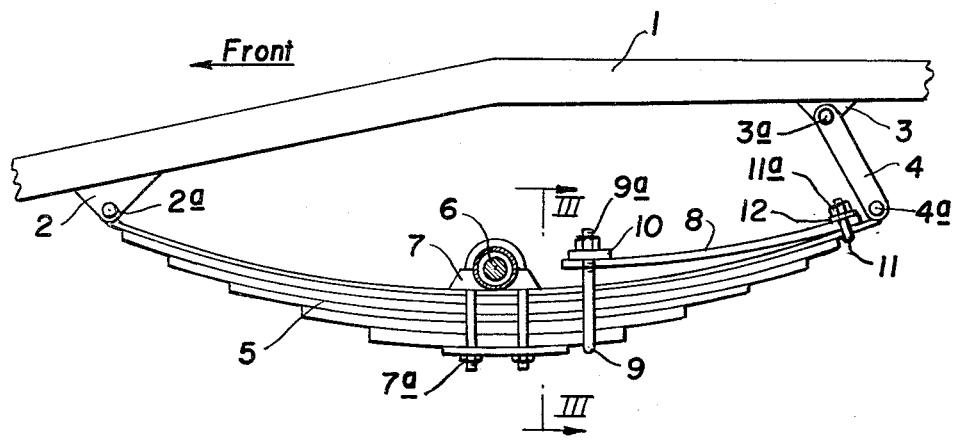
FIGURE 1 is a side elevation of a spring suspension for the rear wheels of an automobile and embodying the principles of my invention.

Referring more particularly to FIGURE 1 of the drawing, numeral 1 denotes a frame portion at the rear part of a vehicle having rigidly attached, underneath it, a spring supporting bracket or hanger 2 consisting of a pair spaced parallel flanges between which extends a pivotal pin or bolt 2a for supporting the forward end of a multi-leaf spring 5. The direction of the front end of the vehicle is indicated by the arrow.

The leaves of spring 5 are held together, and the central portion of the spring 5 is mounted on (or under) the rear axle 6 by means of U-bolts or clips and brackets 7 which are rigidly held together by tightening of nuts 7a.

Underneath the rear portion of frame 1 is rigidly secured a bracket 3 similar to bracket 2 and through which bolt 3a extends for pivotally mounting the upper end of a shackle 4. The lower end of the shackle 4 is pivotally mounted by pin or bolt 4a to the rear end portion of the longest or uppermost leaf of spring 5.

Figure 3:
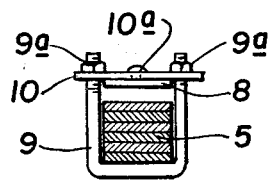
FIG. 3 is a cross-sectional view taken along line III—III of FIG. 1.
Figure 2:
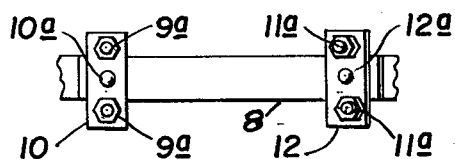
FIG. 2 is a top view of helper spring 8 of FIG. 1 and its terminal connections to spring 5.

An important feature of my invention resides in the construction and operation of an auxiliary spring 8, which may be in the form of a single leaf, as shown, or a plurality of leaves in laminated form. The left end of spring 8, as viewed in FIG. 1, is anchored by a U-bolt 9, shown also in FIG. 3, having threaded end portions or extremities onto which nuts 9a are screwed to serve as stop members for a U-bolt plate 10 which is riveted, bolted or otherwise secured at 10a to one end of helper spring 8. Bolt 9 goes through holes in plate 10.

The right or rearward portion of helper spring 8 is anchored to spring 5 by a U-bolt 11 whose ends are threaded to receive nuts 11a which are tightened to clamp plate 12 (secured at 12a to the rear end of helper spring 8) against the top rear end portion of spring 8. It will be understood that there are two spring suspensions as shown in FIG. 1, one for the rear left wheel and one for the rear right wheel.

By tightening nuts 9a so as to move plate 10 closer to spring 5, a greater portion of the length of helper spring 8 contacts the top leaf of spring 5 so as to shorten the effective length of the spring and add stiffness to the spring assemby. The left or forward end of spring 8, of course, is normally positioned as shown, urging plate 10 upwardly so that only a small portion of the rearward end of the spring contacts the top surface of the uppermost leaf to permit substantial flexibility or "softness" of the ride.

In operation, therefore, when it is desired to stiffen the spring assembly so as to carry heavier loads, nuts 9a are tightened so as to provide a progressively longer rolling contact surface area between the rear portion of helper spring 8 and the top surface of the upper leaf of spring 5 which it overlies. When lighter loads are to be carried and a "softer" ride is desired, nuts 9a are unscrewed sufficiently so that only a very small length of the upper leaf of spring 5 is contacted by helper spring 8 as shown in FIG. 1, whereby the effective length of spring 5 is substantially that of such spring without a helper. This would be the position of the spring assembly for normal loading of the vehicle, that is, without passengers, and so as to give a "soft" ride. Upon loading or upon hitting of an obstruction which would tend to straighten the spring 5, a greater portion of the length of helper spring 8 will contact the upper leaf of spring 5 so as to strengthen or stiffen the spring assembly. For heavier loads or where greater rebound shocks are encountered, nuts 9a are tightened initially so as to move plate 10 closer to the upper leaf of spring 5.

While the vehicle spring suspension has been described as being applicable to a rear wheel suspension, it will be apparent that it is also useful for a front wheel suspension.

Thus it will also be seen that I have provided an efficient and relatively simple vehicle spring suspension which will automatically vary the length of the spring in response to loading or rebound from road irregularities in order to increase the stiffness of the spring in response to heavy loading and thus prevent the possibility of breakage at the weakest point, namely, the end of the upper leaf, and to allow the full length of the upper leaf to come into play at the moment the additional loading is removed so as to increase the resilience of the spring and the softness of the ride; furthermore, I have provided a spring suspension which will control rebound movements somewhat as a shock absorber and which greatly stabilizes a car, particularly when travelling around bends, thus being a great aid to knee action cars, particularly, which have a tendency to become unstable around bends; furthermore, I have provided means for varying the degree of stiffness of the spring or the softness of the ride and providing substantially longer life than previous helper springs, therefore making the spring suitable for widely different loads and eliminating sliding parts that wear from friction.

While I have illustrated and described a single embodiment of my invention, it will be understood that this is by way of illustration only, and that various changes and modifications may be made within the contemplation of my invention and within the scope of the following claims.

I claim:

1. In a vehicle having a spring suspension for a wheel thereof comprising a main leaf spring having ends secured to longitudinally spaced points of said vehicle and a wheel axle bolted to an intermediate portion of said main leaf spring, in combination, a separate auxiliary spring leaf spring overlying about half the length of said main spring and normally contacting only a portion of the overlain length, a clamp detachably securing one end portion of said auxiliary spring to an end portion of said main leaf spring, a second clamp detachably securing an intermediate portion of said main leaf spring to a spaced free end of said auxiliary leaf spring, said second clamp including bolt means for adjusting the amount of spacing between said end of the auxiliary leaf spring and said main leaf spring for adjustably limiting the amount of spacing between the main leaf spring and said spaced free end of the auxiliary leaf spring and for varying the normal length of contact between said leaf springs, whereby upon deflection and straightening of the main leaf spring from rebound, there will be a progressive yieldable increase in length of contact between said leaf springs which will cause a progressive increase in strength of the combined leaf springs, and whereby upon adjusting said bolt to increase said spacing between leaf springs, a softer ride will be obtained.

2. The combination recited in claim 1 wherein said second clamp is of substantially U-shape having threaded extremities, a plate having holes through which said extremities extend and being rigidly secured to said free end of said auxiliary spring, and wherein said bolt means comprises bolts threadedly engaging said threaded extremities so that upon turning of said bolts the spacing of said free end of the auxiliary leaf spring may be adjustably varied to adjust the stiffness of the combined leaf springs.

References Cited in the file of this patent

UNITED STATES PATENTS

| | | |
|---|---|---|
| 1,858,930 | Hoover | May 17, 1932 |
| 2,372,201 | Hellwig | Mar. 27, 1945 |
| 2,656,181 | Hellwig | Oct. 20, 1953 |
| 2,928,669 | Lenet | Mar. 15, 1960 |